(12) United States Patent
Wolff et al.

(10) Patent No.: US 10,721,695 B2
(45) Date of Patent: Jul. 21, 2020

(54) METHOD AND APPARATUS FOR PERFORMING FREQUENCY SYNCHRONIZATION FOR CARRIERS

(71) Applicant: Nokia Technologies Oy, Espoo (FI)

(72) Inventors: Gunter Wolff, Laupheim (DE); Mikko Kokkonen, Helsinki (FI); Hartmut Wilhelm, Ulm (DE); Mihai Enescu, Epsoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/065,203

(22) PCT Filed: Dec. 12, 2016

(86) PCT No.: PCT/FI2016/050866
§ 371 (c)(1),
(2) Date: Jun. 22, 2018

(87) PCT Pub. No.: WO2017/118778
PCT Pub. Date: Jul. 13, 2017

(65) Prior Publication Data
US 2018/0376436 A1 Dec. 27, 2018

Related U.S. Application Data

(60) Provisional application No. 62/276,644, filed on Jan. 8, 2016.

(51) Int. Cl.
*H04W 56/00* (2009.01)
*H04L 27/00* (2006.01)
(Continued)

(52) U.S. Cl.
CPC ......... *H04W 56/00* (2013.01); *H04J 11/0069* (2013.01); *H04L 5/001* (2013.01);
(Continued)

(58) Field of Classification Search
CPC . H04W 56/00; H04W 16/14; H04W 56/0035; H04W 72/04; H04L 27/00; H04L 27/26; H04L 72/04
See application file for complete search history.

(56) References Cited

U.S. PATENT DOCUMENTS 10,264,464 B1 * 4/2019 Bartlett ................ H04L 5/0053
2010/0080308 A1 * 4/2010 Yin ....................... H04L 5/0007
375/260

(Continued)

FOREIGN PATENT DOCUMENTS

WO WO 2015/188848 12/2015

OTHER PUBLICATIONS

3GPP TSG RAN WG1 Meeting #83, Anaheim, USA, Nov. 15-22, 2015, R1-156924, "Analysis of Channel Raster Impact on NB-IoT" Huawei, HiSilicon, 5 pgs.

(Continued)

*Primary Examiner* — Mewale A Ambaye
(74) *Attorney, Agent, or Firm* — Harrington & Smith

(57) ABSTRACT

A method and apparatus may include configuring, by a base station, a synchronization signal. The synchronization signal may be aligned with a sub carrier spacing grid of a radio access technology. The synchronization signal may be positioned at a frequency location that is the same or about the same as a frequency step of a channel raster. The synchronization signal may be transmitted to a user equipment so that the center of the synchronization signal is transmitted with a frequency offset with respect to the center of the radio-access technology bandwidth.

19 Claims, 8 Drawing Sheets

(51) Int. Cl.
*H04L 5/00* (2006.01)
*H04L 27/26* (2006.01)
*H04J 11/00* (2006.01)
*H04W 16/14* (2009.01)

(52) U.S. Cl.
CPC .......... *H04L 5/0048* (2013.01); *H04L 5/0091* (2013.01); *H04L 27/0014* (2013.01); *H04L 27/26* (2013.01); *H04W 56/0035* (2013.01); *H04W 16/14* (2013.01)

(56) References Cited

U.S. PATENT DOCUMENTS

| | | | |
|---|---|---|---|
| 2013/0143502 A1* | 6/2013 | Kazmi | H04W 88/06 455/62 |
| 2013/0250818 A1 | 9/2013 | Gaal et al. | 370/277 |
| 2015/0208372 A1* | 7/2015 | You | H04J 11/0069 370/350 |
| 2016/0227495 A1* | 8/2016 | Lee | H04W 56/00 |
| 2017/0353912 A1* | 12/2017 | Einhaus | H04W 48/12 |
| 2018/0007679 A1* | 1/2018 | Lee | H04W 72/048 |
| 2018/0279267 A1* | 9/2018 | Yasukawa | H04W 72/042 |
| 2018/0317185 A1* | 11/2018 | Chen | H04W 72/04 |
| 2019/0116007 A1* | 4/2019 | Yi | H04W 4/42 |

OTHER PUBLICATIONS

3GPP TSG RAN WG1 #82bis, Oct. 5-9, 2015, Malmo, Sweden, R2-155745 (listed as R1-155745 on the ISR), "Guard-band Operation Scenario Details", Qualcomm Incorporated, 4 pgs.

\* cited by examiner

METHOD AND APPARATUS FOR PERFORMING FREQUENCY SYNCHRONIZATION FOR CARRIERS

This patent application is a U.S. National Stage application of International Patent Application Number PCT/FI2016/050866 filed Dec. 12, 2016, and claims priority to U.S. provisional application 62/276,644 filed Jan. 8, 2016, which are hereby incorporated by reference in their entireties.

BACKGROUND

Field

Certain embodiments of the present invention relate to performing frequency synchronization for carriers.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include configuring, by a base station, a synchronization signal. The synchronization signal may be aligned with a subcarrier spacing grid of a radio access technology. The synchronization signal may be positioned at a frequency location that is the same or about the same as a frequency step of a channel raster. The method may also include transmitting the synchronization signal to a user equipment so that the center of the synchronization signal is transmitted with a frequency offset with respect to the center of the radio-access technology bandwidth.

According to a second embodiment, an apparatus may include at least one processor. The apparatus may include at least one memory including computer program code. The at least one memory and the computer program code may be configured, with the at least one processor, to cause the apparatus at least to configure a synchronization signal. The synchronization signal may be aligned with a subcarrier spacing grid of a radio access technology, and the synchronization signal may be positioned at a frequency location that is the same or about the same as a frequency step of a channel raster. The apparatus may also be caused to transmit the synchronization signal to a user equipment so that the center of the synchronization signal is transmitted with a frequency offset with respect to the center of the radio-access technology bandwidth.

According to a third embodiment, a computer program product may be embodied on a non-transitory computer readable medium. The computer program product may be configured to control a processor to perform a method according to the first embodiment.

According to a fourth embodiment, a method may include receiving, by a user equipment, a synchronization signal from a base station. The synchronization signal may be aligned with a subcarrier spacing grid of a radio access technology. The synchronization signal may be positioned at a frequency location that is the same or about the same as a frequency step of a channel raster and the center of the synchronization signal may be received with a frequency offset with respect to the center of the radio access technology bandwidth. The method may also include identifying the radio access technology or a radio access technology deployment scenario based on the synchronization signal.

According to a fifth embodiment, an apparatus may include at least one processor. The apparatus may also include at least one memory including computer program code. The at least one memory and the computer program code may be configured, with the at least one processor, to cause the apparatus at least to receive a synchronization signal from a base station. The synchronization signal may be aligned with a subcarrier spacing grid of a radio access technology, and the synchronization signal may be positioned at a frequency location that is the same or about the same as a frequency step of a channel raster. The apparatus may also be caused to identify the radio access technology or a radio access technology deployment scenario based on the synchronization signal.

According to a sixth embodiment, a computer program product may be embodied on a non-transitory computer readable medium. The computer program product may be configured to control a processor to perform a method according to the fourth embodiment.

According to a seventh embodiment, an apparatus may comprise means for performing a method according to the first or the fourth embodiment.

According to an eighth embodiment, a communication system may include a transmitter configured to transmit a carrier for reception by a receiver. The carrier may include a synchronization signal for synchronizing the receiver to the carrier. The communication system may also include an allowed channel raster for the carrier's synchronization signal. The communication system may also include a bandwidth of the carrier The bandwidth of the carrier is larger than a frequency step size of the channel raster. A bandwidth of the synchronization signal is smaller than the carrier's bandwidth. The synchronization signal is centered around one of the channel raster positions. The synchronization signal is positioned inside the carrier bandwidth. The allowed position of the synchronization signal inside the carrier bandwidth depends on the carrier's center frequency and the channel raster.

BRIEF DESCRIPTION OF THE DRAWINGS

For proper understanding of the invention, reference should be made to the accompanying drawings, wherein.

DETAILED DESCRIPTION

Figure 1:
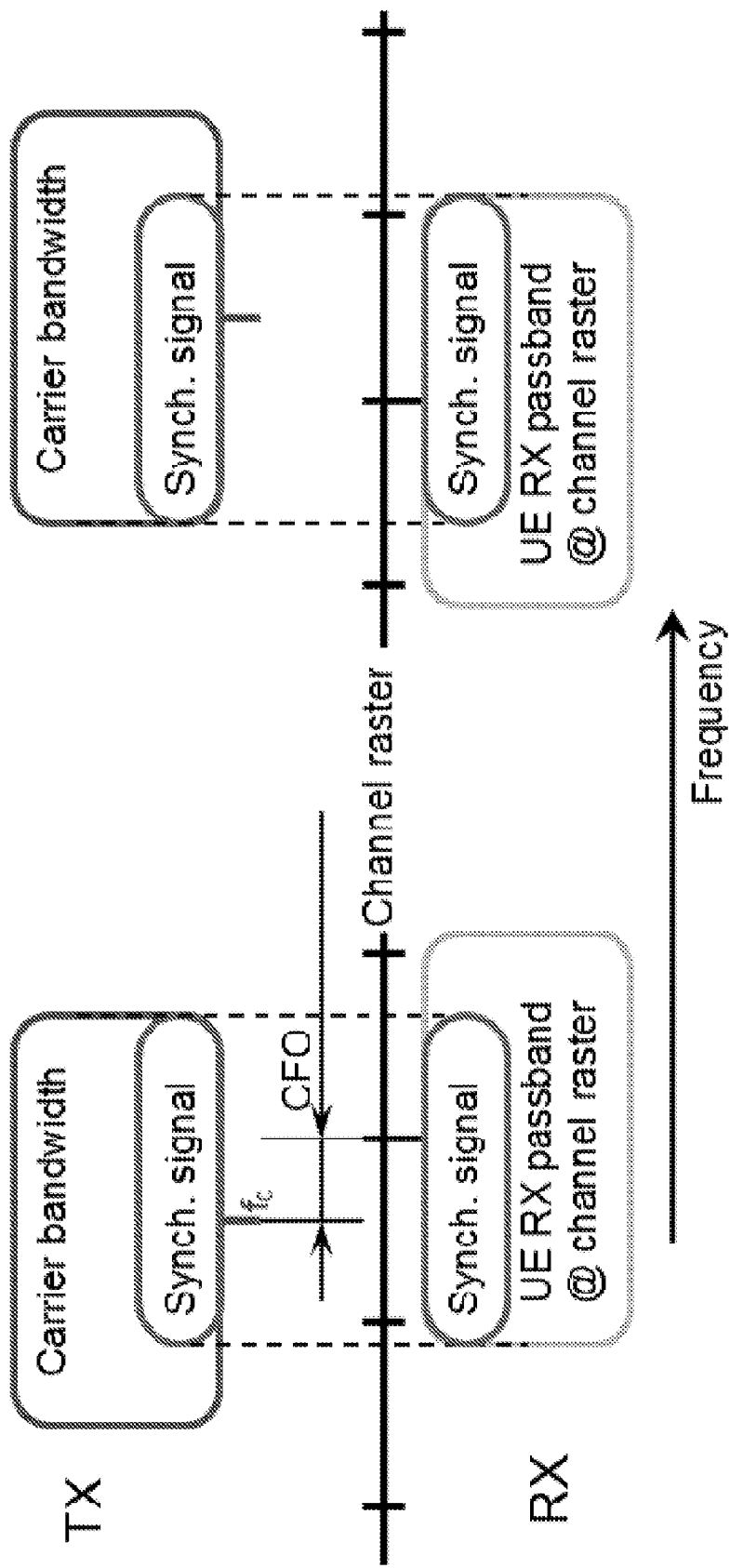
FIG. 1 illustrates a synchronization signal in an overlapping frequency range, in accordance with certain embodiments of the present invention.

In mobile networks, a user equipment (UE) communicates with one or more base stations (BS). When the UE is first switched on or when the UE needs to re-establish a lost connection with a base station, the UE has to find a frequency position at which an appropriate radio access technology (RAT) is provided by the base station.

In order to facilitate the UE's search procedure for the frequency position of a RAT, the frequency position (such as a center frequency of a carrier bandwidth, for example) of each RAT is usually located on a channel raster. The channel raster may include frequency steps that are used by the UE in order to find a RAT, where the center frequency of the system is typically matched to these frequency steps, that is, with the channel raster. If the frequency position of a RAT is on the channel raster, the UE may efficiently identify and register with the RAT. Thus, a connection between the UE and the base station can be established within a reasonable amount of time.

Typically, a channel raster is designed/specified with the introduction of a new technology which requires channel synchronization. 3GPP narrow band Internet of things (NB-IoT) is currently specified in 3GPP Release 13. NB-IoT may support different modes of operation such as, for example, (1) a stand-alone operation, (2) a guard-band operation, and/or (3) an in-band operation. The guard-band operation may use unused resource blocks within an LTE carrier's guard-band, and the in-band operation may use resource blocks within a normal LTE carrier.

Long Term Evolution (LTE) systems have a channel raster that is based on 100 kHz steps, which means that the carrier center frequency is an integer multiple of 100 kHz. A channel raster that is based on 100 kHz steps may also be considered to be a channel raster with a 100 kHz grid. An NB-IoT channel has an allocated width of 180 kHz (corresponding to 1 Physical Resource Block (PRB)). With regard to in-band and guard band operation, as the empty LTE DC subcarrier contributes +/−7.5 kHz to the NB-IoT frequency offset to the channel raster, there can be no alignment with both, the 100 kHz channel raster and the 15 kHz OFDM subcarrier spacing grid at the same time. As such, excluding direct current (DC) subcarriers, reutilizing the 100 kHz LTE channel raster would result in no alignment with the NB-IoT center frequency. Reutilizing the 100 kHz LTE channel raster may create frequency offsets which, depending on the system bandwidth, would vary from 2.5 kHz to 47.5 kHz. Hence, there is a risk that frequency synchronization within the original channel raster will fail, especially when large frequency offsets are encountered, and there is a risk that the UE is unable to establish a connection.

Alternatively, a very dense channel raster could be introduced in order to decrease the risk of a failed frequency synchronization. However, introducing a very dense channel raster may significantly increase a sweep time for the UE, and, hence, introducing the very dense channel raster may require the UE to expend more power in order to achieve frequency synchronization, before the connection is established. Increasing the power that is expended by the UE for frequency synchronization may have a substantial effect on the lifetime of the UE's battery, especially when the UE's battery is intended for long-term operation over several years.

With the previous approaches, carrier positions (such as center frequencies) with a minimal amount of frequency offset from a channel raster are favored. The offsets are generally small enough in order to allow the usual UE frequency error correction to take over and to position the UE at the desired frequency. However, with the previous approaches, most of the potential carrier positions cannot be utilized, because the frequency offset between the positions of these other potential carrier positions and the channel raster is too large for the UE frequency error correction to compensate for.

Certain embodiments of the present invention may be directed to a synchronization signal which is aligned with the 15 kHz LTE subcarrier spacing grid, and the synchronization signal may be positioned at the 100 kHz channel raster. The synchronization signal may have a width that corresponds to less than or equal to six subcarriers. The synchronization signal may enable the UE to perform RAT identification, and may provide information about a carrier frequency offset (CFO) from the channel raster.

In order to not interfere with adjacent carriers, the synchronization signal may be configured in accordance with the following properties:

(a) the synchronization signal is detectable by the UE. For example, the synchronization signal is generally located in a frequency range, which the UE receives, around a channel raster position.

(b) the synchronization signal is sent in a frequency range which is allocated for the carrier of interest. The frequency range which is allocated for the carrier of interest also includes a channel raster frequency with the Carrier Frequency Offset (CFO).

(c) the synchronization signal has a similar position relative to the channel raster, and an identical bandwidth for each and every CFO of the carrier from the channel raster. Thus, the UE can expect the same type of synchronization signal, regardless of the CFO.

Properties (a) and (b) may restrict the bandwidth of the synchronization signal to an overlapping area where the carrier bandwidth (of the base station (BS) transmitter) overlaps with the receiving passband (of the UE receiver).

FIG. 1 illustrates a synchronization signal in an overlapping frequency range, in accordance with certain embodiments of the present invention. With the example of FIG. 1, properties (a) and (b) are fulfilled, but property (c) is not necessarily fulfilled FIG. 1 illustrates two examples of how a synchronization signal could be positioned for two different CFOs. Depending on the NB-IoT PRB placement in the bandwidth, different CFOs may be experienced between the NB-IoT synchronization signal center and the channel raster. In the left part of FIG. 1, the NB-IoT is experiencing a CFO while the NB-IoT PRB depicted in the right side of FIG. 1 is experiencing a different CFO. Properties (a) and (b), however, allow synchronization signals of different bandwidths at different positions, which depend on the CFO and may cause difficulties for a receiver that is aligned with the channel raster.

Fulfilling the properties a) and b) only, the location of the synchronization signal may vary, depending on the carrier frequency offset (CFO) with respect to the channel raster. Because the location of the synchronization signal may vary, this varying may cause difficulties for the UE to synchronize.

In further view of property (c) above, the bandwidth that the synchronization signal possibly occupies is further limited by the largest allowable offset in both directions, and may result in a fixed bandwidth and position for the synchronization signal with respect to the channel raster. As the position of the synchronization signal inside the IoT PRB may differ between IoT PRBs, certain embodiments may need to signal such an offset. With a fixed bandwidth, it may be understood that a same number of subcarriers form the synchronization signal. The bandwidth of the (primary) synchronization signal BWpss can be obtained as follows: BWpss=BWcar−2·max(0, CFOmax−Δf) where BWcar defines the Carrier bandwidth, e.g. 180 kHz for NB-IoT, CFOmax defines the maximum supported carrier frequency offset with respect to channel raster, e.g. 47.5 kHz for NB-IoT (lower numbers exclude service in some PRBs), Δf defines the tolerated frequency offset for the synchronization signal from the channel raster (UE capability), e.g. 2.5 kHz. The exemplary numbers yield BWpss/kHz=180−2·max(0, 47.5−2.5)=90 (equivalent with 6 subcarriers of 15 kHz each).

Figure 2:
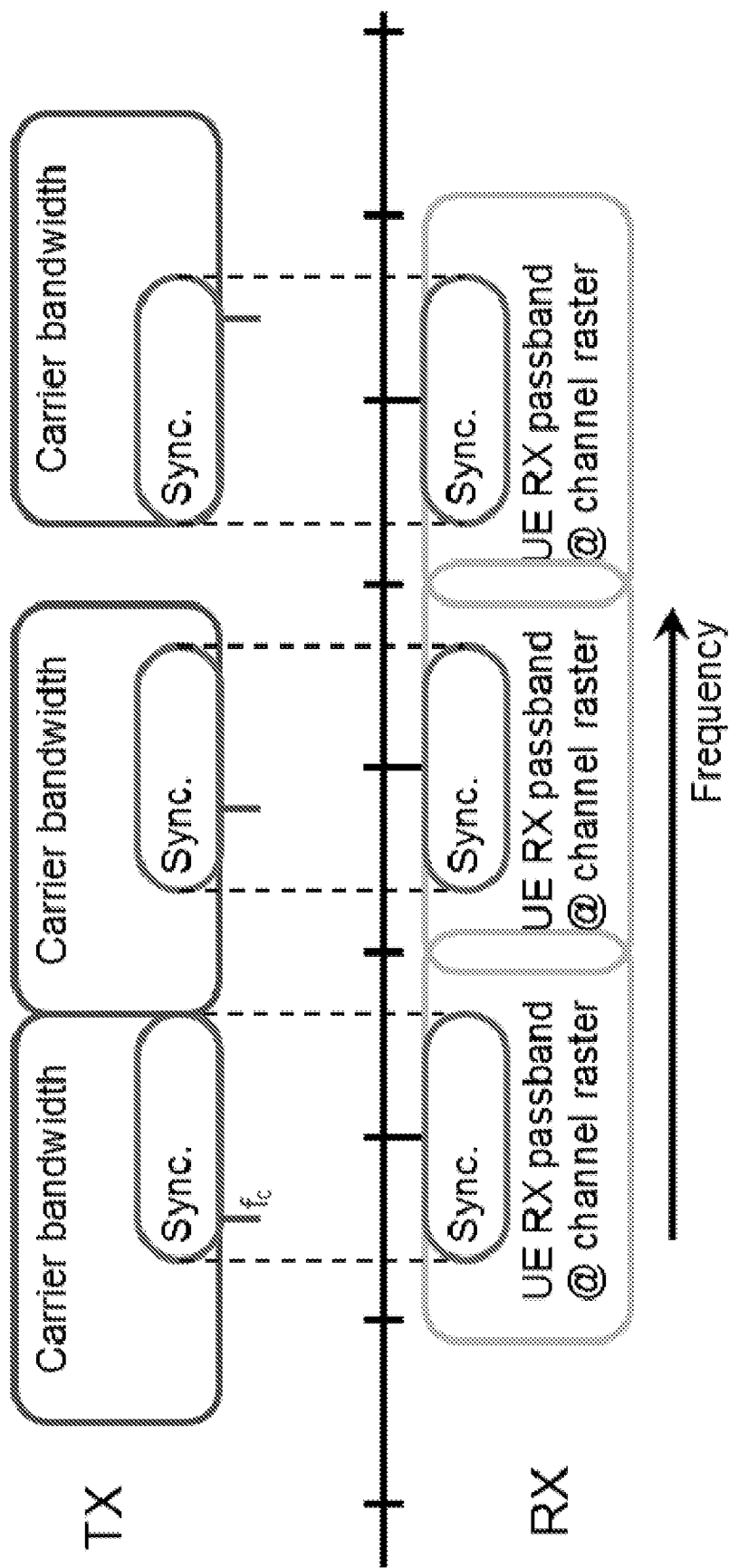
FIG. 2 illustrates a fixed bandwidth and position, in accordance with certain embodiments of the present invention.

FIG. 2 illustrates a fixed bandwidth and position, in accordance with certain embodiments of the present invention. The example of FIG. 2 fulfills properties (a) through (c). A UE may easily find the position where the synchronization signal is located (at least approximately) in the channel raster. Once the UE finds the position of the synchronization signal, the UE may refer to CFO information of the synchronization signal, and the UE may be directly guided to the carrier frequency position (such as to the center frequency, for example).

FIG. 1 illustrates that the position of the synchronization signal can be aligned with the channel raster, independent of the carrier frequency offset between the synchronization center and the NB-IoT PRB center, if the bandwidth is reduced.

With certain embodiments, narrowing the receiving bandwidth may be beneficial for the reception of the synchronization signal. Otherwise, interference from between adjacent carriers may occur.

In practice, a UE may still receive signals with minor frequency deviation. As such, a synchronization signal may be slightly shifted with respect to the channel raster. Hence, a somewhat larger bandwidth of the synchronization signal may possibly be tolerated (for example, a bandwidth of 90 kHz may be tolerated, instead of 85 kHz, for a 2.5 kHz offset from channel raster, as described in more detail below).

With regard to implementing certain embodiments of the present invention, an example approach of performing NB-IoT in-band and NB-IOT guard band operation is described as follows. This example approach may also be useful for other carrier types and other conditions as well.

For in-band operation, inside an Orthogonal Frequency Division Multiple Access (OFDMA) based hosting system (such as an LTE system, for example), a physical resource block (PRB) may be reserved for NB-IoT operation. Each PRB may include a group of 12 subsequent subcarriers, with each subcarrier having a width that is 15 kHz wide. With this configuration, NB-IoT carrier frequencies may differ by multiples of 180 kHz (corresponding to 12×15 kHz) in the same hosting system.

Because of an empty direct current (DC) subcarrier inside the hosting LTE system, which means subtracting 15 kHz from the system bandwidth, there may be an additional offset of ±97.5 kHz or ±187.5 kHz. LTE itself is aligned with a 100 kHz channel raster. The possible in-band frequencies for in-band operation of NB-IoT are:
$f_{NB-IoT}$(kHz)=100 m±(180n+187.5) n=3, 4, 5, . . . for LTE3, LTE5, LTE15; and $f_{NB-IoT}$(kHz)=100 m±(180n+97.5) n=3, 4, 5, . . . for LTE10, LTE20, where LTE3 corresponds to a 3 MHz LTE deployment, LTE 5 corresponds to a 5 MHz deployment, and so on.

The parameter "m" is chosen such that the hosting LTE system is completely located inside the correct frequency band. The possible CFOs to the 100 kHz channel raster for NB-IoT are:
±2.5 kHz, ±17.5 kHz, ±22.5 kHz, ±37.5 kHz, ±42.5 kHz, for LTE10 and LTE20; and ±7.5 kHz, ±12.5 kHz, ±27.5 kHz, ±32.5 kHz, ±47.5 kHz, for LTE3, LTE5 and LTE15

The synchronization signal bandwidth would be then limited to:
180 kHz−2·42.5 kHz=95 kHz, for LTE10 and LTE20; and 180 kHz−2·47.5 kHz=85 kHz, for LTE3, LTE5 and LTE15.

In the second case, only 5 kHz are missing for allowing the second case to transmit a 90 kHz synchronization signal. A 90 kHz synchronization signal corresponds to 6 subcarriers. Because few resource blocks require a CFO of 47.5 kHz, their positions may be closed for in-band NB-IoT operation in order to have 90 kHz width (for 6 subcarriers) available. Still, with a CFO of 47.5 kHz, a synchronization signal frequency offset of 2.5 kHz may be considered to be tolerable, and using 6 subcarriers for transmitting a synchronization signal would be feasible in this case as well.

However, if a synchronization signal has to be provided for a CFO of 47.5 kHz, the synchronization signal has an offset of just 45 kHz to the carrier, and the synchronization signal remains 2.5 kHz misaligned with the channel raster. The UE will not be perfectly synchronized with the channel raster anyways, and hence can tolerate small misalignments. This allows to place the synchronization signal slightly (+/−2.5 kHz) off the channel raster, thus enlarging the overlap with the NB-IoT PRB by 2.5 kHz on each side. According with the formula as described above, this tolerated misalignment allows for a larger bandwidth of the (primary) synchronization signal, which is desirable. However, the tolerated misalignment introduces some signal error and hence is limited. For all other offsets, the synchronization signal may compensate the frequency offset to the channel raster. For example, the synchronization signal may be aligned with the channel raster.

If fewer than 6 subcarriers are used for the synchronization signal, the problem of insufficient frequency shift will generally not occur.

Because the offset to the carrier is almost never an integer multiple of 15 kHz, orthogonality to the hosting LTE system may be lost, which may cause inter-carrier interference. To avoid this inter-carrier interference, the synchronization signal may be projected on all available subcarriers for NB-IoT transmission, before the synchronization signal is sent. In the case of guard-band operation, the projection may be projected on even more than 12 subcarriers, if the power spectrum density on the additional subcarriers is sufficiently low. The set of all (used and unused) LTE subcarriers represents a complete set of normalized orthogonal functions. The utilization of these subcarriers hence eliminates interference between any two groups (e.g. PRBs) of these subcarriers. Practically, minor effects as delay spread or nonlinearities destroy this orthogonality, but the set of orthogonal subcarriers still provides sufficiently high isolation. This orthogonality is lost, if tones are located "between" the frequency grid positions of the set of orthogonal LTE subcarriers. This means that such an "off-grid" tone is represented as a linear combination of all LTE subcarriers, which consequently causes interference with the adjacent services. Projection on all subcarriers inside an NB-IoT PRB means, that in the above linear combination only contributions from (orthogonal) hosting LTE subcarriers, which are allocated for NB-IoT operation, are considered. All other coefficients in that linear combination (i.e. those from subcarriers, which are occupied by the hosting LTE service) are set equal to zero. This will introduce a small error to the projected signal, but the projection is now orthogonal to the hosting LTE service.

Figure 3:
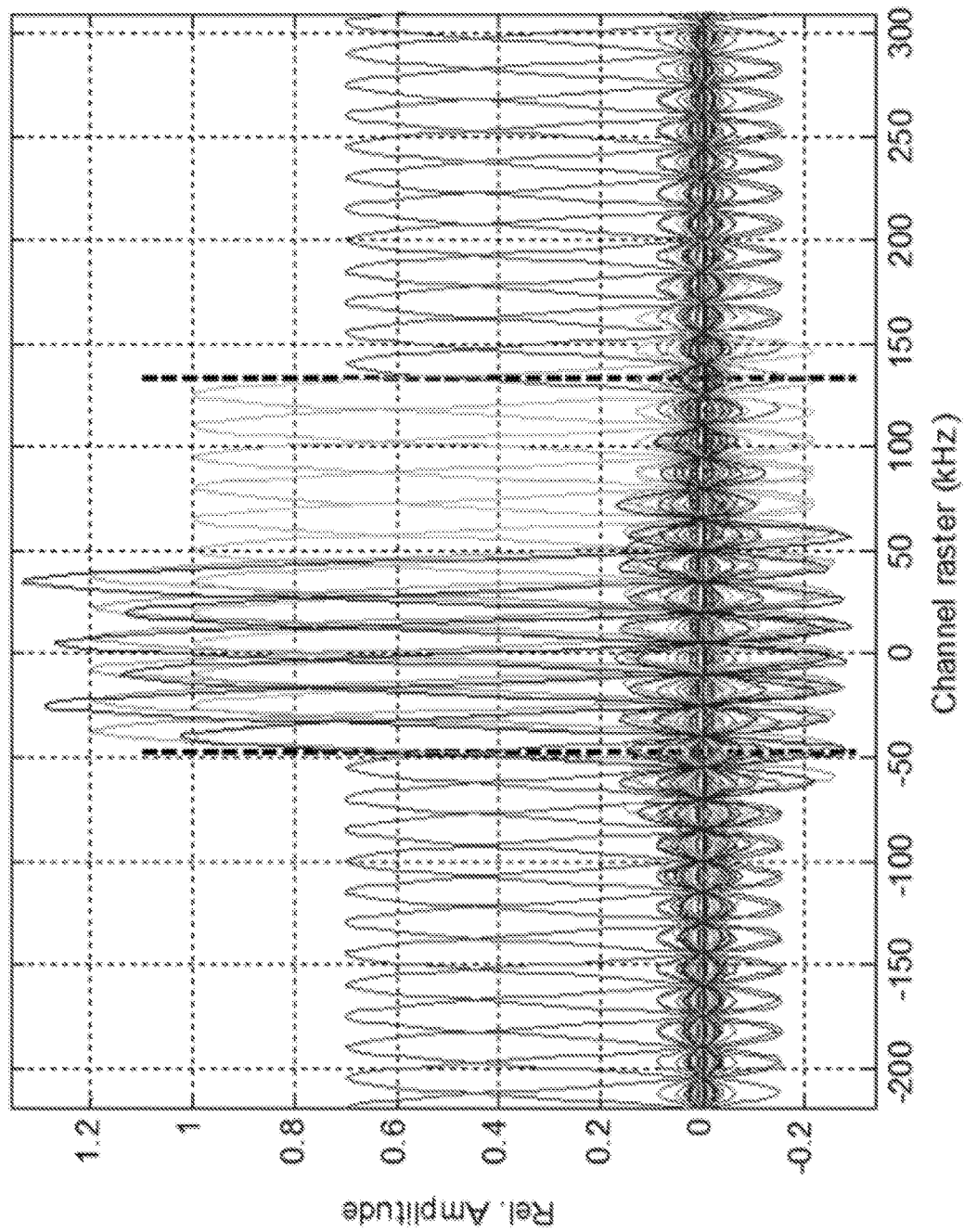
FIG. 3 illustrates an example projection, in accordance with certain embodiments of the present invention.

FIG. 3 illustrates an example projection, in accordance with certain embodiments. In the example projection of FIG. 3, the CFO may be 42.5 kHz. Although this projection introduces a small modification to the synchronization signal, the resulting error is tolerable, and orthogonality with the hosting LTE may be maintained.

FIG. 3 illustrates an example projection of a synchronization signal with a CFO of 42.5 kHz. FIG. 3 also illustrates NB-IoT subcarriers, which are aligned (i.e., orthogonal) with a grid of hosting LTE subcarriers. Because the synchronization signal before projection is not aligned with the grid of the hosting LTE subcarriers, LTE would have to suffer from interference of NB-IoT. After the projection, the synchronization signal is well-aligned with the hosting LTE grid. The range of NB-IoT operation is separated by the black dashed lines. With regard to alignment with the hosting LTE grid, a synchronization signal, which resides on the 15 kHz LTE subcarrier grid, may be misaligned (at least +/−2.5 kHz) with the 100 kHz channel raster. If the synchronization signal is aligned with the channel raster without projection, orthogonality of the synchronization signal with hosting LTE is lost. Projection establishes this orthogonality at a price of a small error.

The synchronization signal itself may provide the CFO information to the UE, which causes the UE to tune in appropriately. This frequency offset between the center of the synchronization signal and the center of the hosting system/radio-access-technology may be signalled or may be known by the user equipment. If the network signals the CFO, this can be indicated by means of a primary synchronization signal and/or a secondary synchronization signal. Alternatively, this can be indicated by cyclic shifts of a secondary synchronization signal.

As an alternative option, the (six or fewer) subcarriers of the synchronization signal may be aligned with the 15 kHz LTE grid from the beginning. Thus, a frequency offset of the synchronization signal (that is less than or equal to 7.5 kHz) to the channel raster may appear. However, this synchronization signal is orthogonal with the hosting LTE from the beginning and may not need any projection.

With regard to guard band operation, a same method can be applied. Instead of 180 kHz, the granularity for frequency offsets inside the hosting LTE may be 15 kHz.

The resulting frequencies may be: $f_{NB-IoT}(kHz)=100\ m\pm(15\ g+7.5)$ (all LTE systems), which have all the following options for CFOs (kHz):
±2.5, ±7.5, ±12.5, ±17.5, ±22.5, ±27.5, ±32.5, ±37.5, ±42.5, ±47.5

The methods that are applicable to guard band operation may be similar to the methods for in-band operation.

Alternatively, a guard band operated NB-IoT can be aligned with the channel raster. As such, the orthogonality with the hosting LTE system may be lost and sufficient filtering may have to be provided.

For all of the above methods, the same procedure for establishing a connection between a BS and an UE can be applied. The procedure for establishing the connection between the BS and the UE can deviate from a usual procedure as follows.

First, the UE may perform a search on the 100 kHz raster until an NB-IoT synchronization signal is found. The synchronization signal may have a small frequency offset against the channel raster. Second, the UE compensates this small frequency offset and reads the synchronization signal information. Third, the UE applies the frequency correction value (CFO) from the synchronization signal and starts with the attaching to the network. Fourth, optionally, the network provides a piece of information about the carrier's center frequency, which the UE can use for its automatic frequency control (AFC).

The above operation is not restricted to a 100 kHz raster but may be applied to any raster size, provided that the synchronization signal is transmitted in alignment with the raster, and the CFO between the synchronization signal and the channel of interest is known or signalled to the UE.

In view of the above, certain embodiments of the present invention may enable a fast frequency sweep, because the 100 kHz channel raster can be used, instead of additionally providing a 5 kHz frequency grid with a 2.5 kHz offset.

Figure 4:
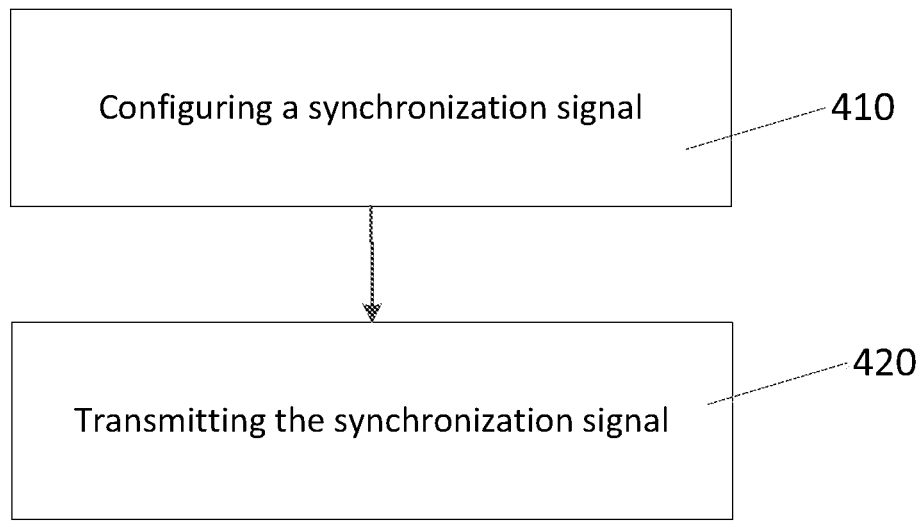
FIG. 4 illustrates a flowchart of a method in accordance with certain embodiments of the invention.

FIG. 4 illustrates a flowchart of a method in accordance with certain embodiments of the invention. The method illustrated in FIG. 4 includes, at 410, configuring, by a base station, a synchronization signal. The synchronization signal is aligned with a subcarrier spacing grid of a radio-access technology. The synchronization signal is positioned at frequency locations that are the same or about the same as frequency steps of a channel raster. The center of the synchronization signal may be transmitted with a frequency offset with respect to the center of the radio-access-technology bandwidth. The method may also include, at 420, transmitting the synchronization signal to a user equipment. The synchronization signal is transmitted within a carrier bandwidth.

Figure 5:
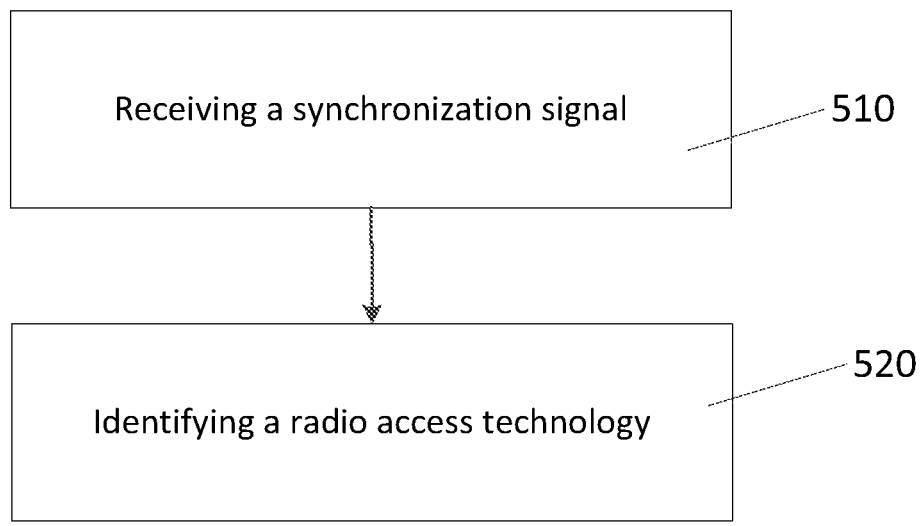
FIG. 5 illustrates a flowchart of a method in accordance with certain embodiments of the invention.

FIG. 5 illustrates a flowchart of a method in accordance with certain embodiments of the invention. The method illustrated in FIG. 5 includes, at 510, receiving, by a user equipment, a synchronization signal from a base station. The synchronization signal is aligned with a subcarrier spacing grid of a radio-access technology. The synchronization signal is positioned at frequency locations that are the same or about the same as frequency steps of a channel raster. The method may also include, at 520, identifying the radio access technology based on the synchronization signal.

Figure 6:
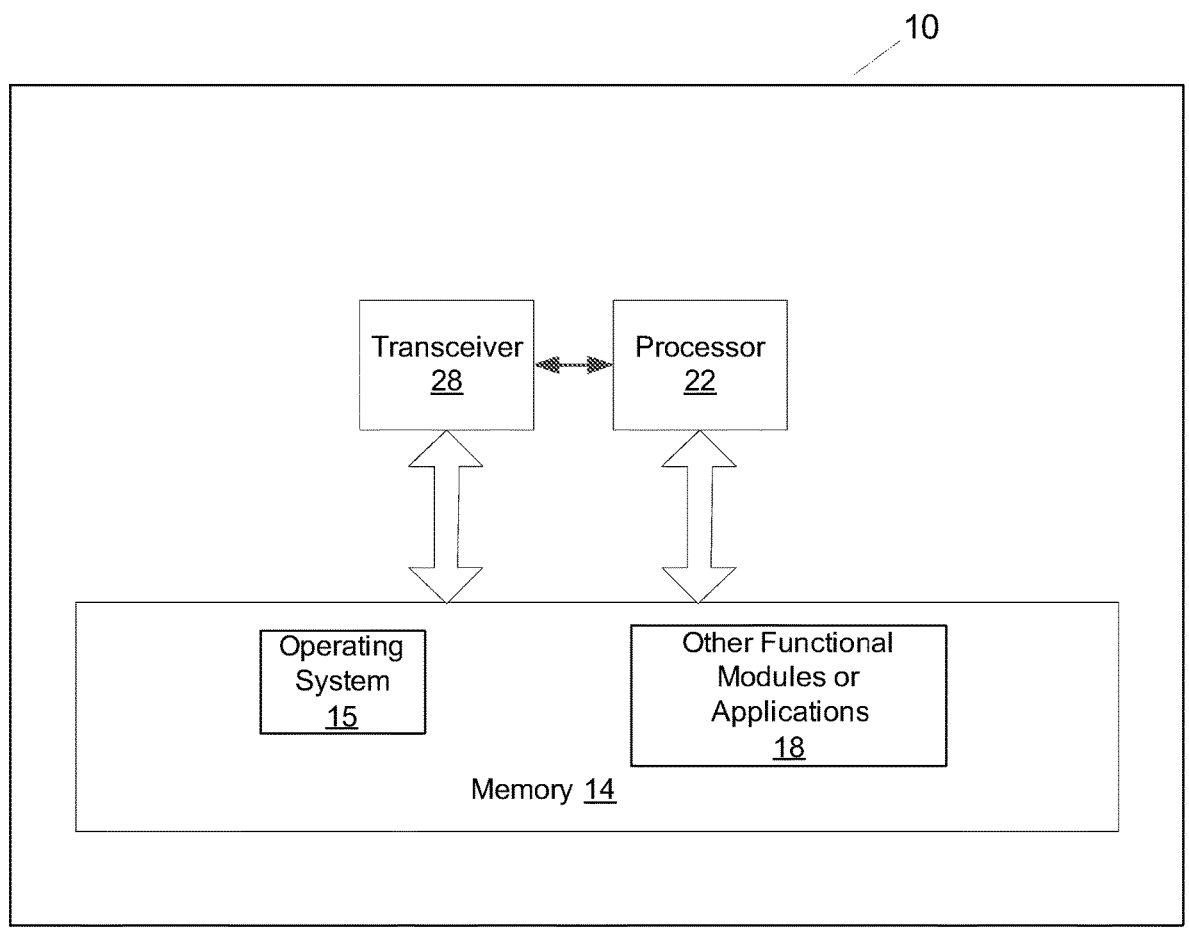
FIG. 6 illustrates an apparatus in accordance with certain embodiments of the invention.

FIG. 6 illustrates an apparatus in accordance with certain embodiments of the invention. In one embodiment, the apparatus can be a base station and/or an evolved Node B, for example. In another embodiment, the apparatus may be a UE, for example. The apparatus may be a transmitter or a receiver. The apparatus may be configured to perform, at least, the methods described in FIG. 4 and/or FIG. 5. Apparatus 10 can include a processor 22 for processing information and executing instructions or operations. Processor 22 can be any type of general or specific purpose processor. While a single processor 22 is shown in FIG. 6, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 7:
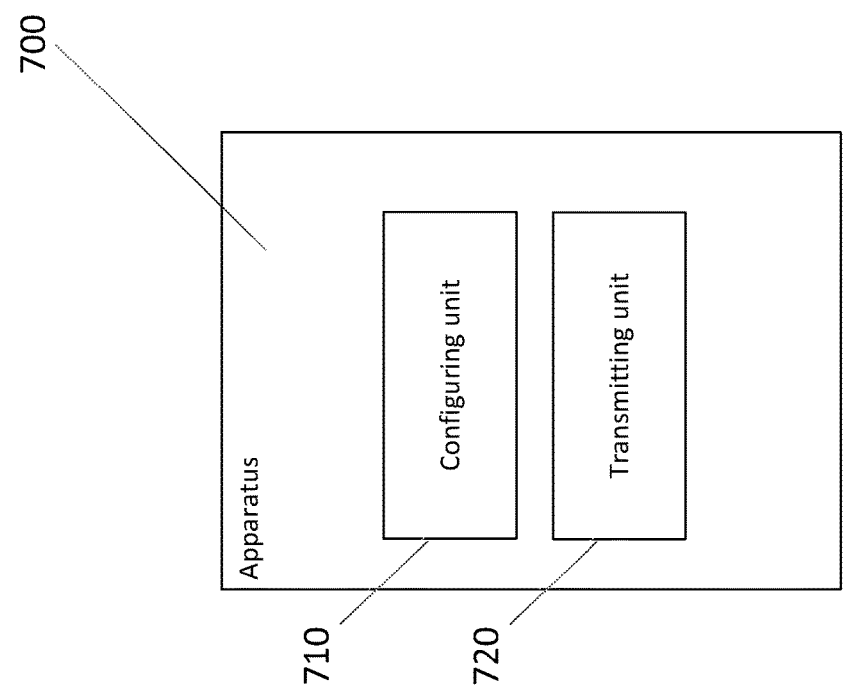
FIG. 7 illustrates an apparatus in accordance with certain embodiments of the invention.

FIG. 7 illustrates an apparatus in accordance with certain embodiments of the invention. Apparatus 700 can be a base station, for example. Apparatus 700 can include a configuring unit 710 that configures a synchronization signal. The synchronization signal is aligned with a subcarrier spacing grid of a radio-access technology, and the synchronization signal is positioned at frequency locations that are the same or about the same as frequency steps of a channel raster. The synchronization signal is not necessarily positioned at frequency locations that are the same as frequency steps of a channel raster, because minor offsets (such as ±2.5 kHz, for example) may be accepted. As another example, a minor offset may be considered to be 10% of the steps of channel raster (e.g., 100 kHZ +/−10 kHz), for example. The center of the synchronization signal is transmitted with a frequency offset with respect to the center of the radio-access-technology bandwidth. Apparatus 700 can also include a transmitting unit 720 that transmits the synchronization signal to a user equipment. The synchronization signal is transmitted within a carrier bandwidth.

Figure 8:
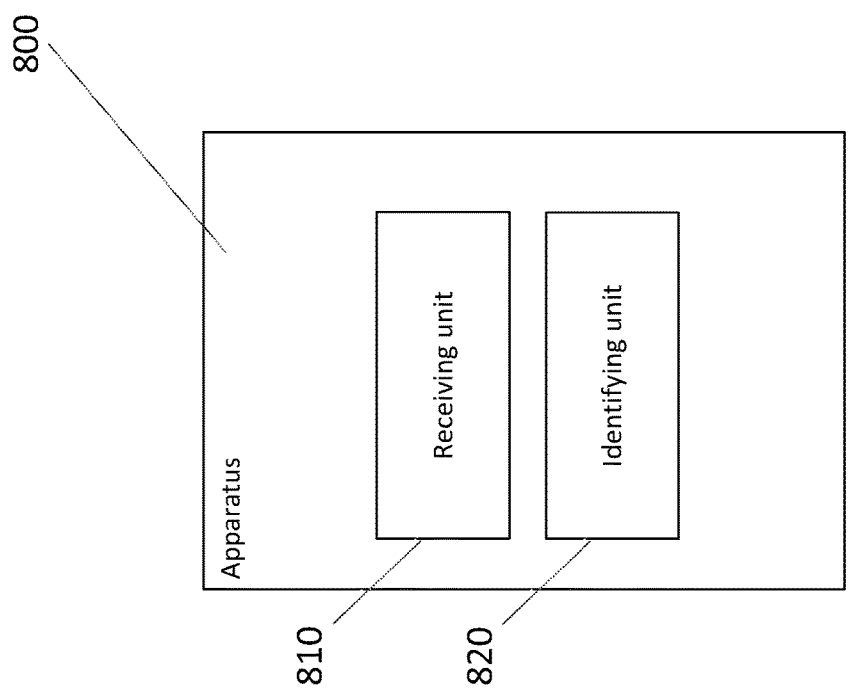
FIG. 8 illustrates an apparatus in accordance with certain embodiments of the invention.

FIG. 8 illustrates an apparatus in accordance with certain embodiments of the invention. Apparatus 800 can be a user equipment, for example. Apparatus 800 can include a receiving unit 810 that receives a synchronization signal from a base station. The synchronization signal is aligned with a subcarrier spacing grid of a radio-access technology. The synchronization signal is positioned at frequency locations that are the same or about the same as frequency steps of a channel raster. Apparatus 800 may also include an identifying unit 820 that identifies the radio access technology based on the synchronization signal.

In an exemplary embodiment, an apparatus, such as a user equipment or base station, may comprise means for carrying out the embodiments described above and any combination thereof.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method comprising:
configuring, by a base station, a carrier comprising a synchronization signal, the carrier having a carrier bandwidth and a center frequency, wherein the synchronization signal is positioned at a frequency location substantially equal to a frequency step of a channel raster for the synchronization signal; and
transmitting the synchronization signal to a user equipment within the carrier bandwidth so that a center of the synchronization signal has a frequency offset with respect to the center of the carrier bandwidth, wherein the allowed position of the synchronization signal inside the carrier bandwidth depends on the center frequency of the carrier and the channel raster, and indicating to the user equipment, after it finds the position of the synchronization signal, a position of the carrier frequency.

2. The method according to claim 1, wherein the synchronization signal is aligned with a subcarrier spacing grid of a radio-access technology.

3. The method according to claim 1, wherein the synchronization signal is configured to enable the user equipment to identify a radio access technology deployment scenario or a radio access technology.

4. The method according to claim 1, wherein the frequency offset between the center of the synchronization signal and center of a radio access technology bandwidth is signaled to the user equipment.

5. An apparatus comprising:
at least one processor; and
at least one memory including computer program code, the at least one memory and the computer program code configured, with the at least one processor, to cause the apparatus at least to:
configure a carrier comprising a synchronization signal, the carrier having a carrier bandwidth and a center frequency, wherein the synchronization signal is positioned at a frequency location substantially equal to a frequency step of a channel raster for the synchronization signal; and
transmit the synchronization signal to a user equipment within the carrier bandwidth so that a center of the synchronization signal has a frequency offset with respect to the center of the carrier bandwidth, wherein the allowed position of the synchronization signal inside the carrier bandwidth depends on the center frequency of the carrier and the channel raster, and indicate to the user equipment, after it finds the position of the synchronization signal, a position of the carrier frequency.

6. The apparatus according to claim 5, wherein the synchronization signal is aligned with a subcarrier spacing grid of a radio-access technology.

7. The apparatus according to claim 5, wherein the frequency offset between the center of the synchronization signal and the center of a radio access technology bandwidth is signaled to the user equipment.

8. A method comprising:

receiving, by a user equipment from a base station, a synchronization signal within a carrier, the carrier having a carrier bandwidth and a center frequency, wherein the synchronization signal is positioned at a frequency location substantially equal to a frequency step of a channel raster for the synchronization signal, wherein the synchronization signal is received within the carrier bandwidth so that a center of the synchronization signal has a frequency offset with respect to the center of the carrier bandwidth, and wherein the allowed position of the synchronization signal inside the carrier bandwidth depends on the center frequency of the carrier and the channel raster, and after finding the position of the synchronization signal, receiving, from the base station, an indication of a position of the carrier frequency.

9. An apparatus comprising:

at least one processor; and at least one memory including computer program code, the at least one memory and the computer program code configured, with the at least one processor, to cause the apparatus at least to:

receive, from a base station, a synchronization signal within a carrier, the carrier having a carrier bandwidth and a center frequency, wherein the synchronization signal is positioned at a frequency location substantially equal to a frequency step of a channel raster for the synchronization signal, wherein the synchronization signal is received within the carrier bandwidth so that a center of the synchronization signal has a frequency offset with respect to the center of the carrier bandwidth, and wherein the allowed position of the synchronization signal inside the carrier bandwidth depends on the center frequency of the carrier and the channel raster, and after finding the position of the synchronization signal, receiving, from the base station, an indication of a position of the carrier frequency.

10. The method according to claim 1, wherein the bandwidth of the synchronization signal is smaller than the carrier bandwidth.

11. The method according to claim 1, wherein variable frequency offsets between the center of the synchronization signal and the center frequency of the carrier are allowed.

12. The method according to claim 1, comprising variable location of synchronization signal depending on carrier frequency offset with respect to the channel raster.

13. The apparatus according to claim 5, wherein variable frequency offsets between the center of the synchronization signal and the center frequency of the carrier are allowed.

14. The method according to claim 8, wherein the synchronization signal is aligned with a subcarrier spacing grid of a radio-access technology.

15. The method according to claim 8, wherein the frequency offset between the center of the synchronization signal and a center of a radio access technology bandwidth is signalled to the user equipment.

16. The method according to claim 8, wherein variable frequency offsets between the center of the synchronization signal and the center frequency of the carrier are allowed.

17. The apparatus according to claim 9, wherein the synchronization signal is aligned with a subcarrier spacing grid of a radio-access technology.

18. The apparatus according to claim 9, wherein the frequency offset between the center of the synchronization signal and the center of a radio access technology bandwidth is signalled to the user equipment.

19. The apparatus according to claim 9, wherein variable frequency offsets between the center of the synchronization signal and the center frequency of the carrier are allowed.

* * * * *